United States Patent
Okubo

(10) Patent No.: US 9,626,995 B2
(45) Date of Patent: Apr. 18, 2017

(54) DISK APPARATUS, CONTROLLER, AND CONTROL METHOD

(71) Applicant: Kabushiki Kaisha Toshiba, Minato-ku, Tokyo (JP)

(72) Inventor: Tomokazu Okubo, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/929,866

(22) Filed: Nov. 2, 2015

(65) Prior Publication Data

US 2017/0011764 A1    Jan. 12, 2017

(30) Foreign Application Priority Data

Jul. 10, 2015    (JP) .................................. 2015-139131

(51) Int. Cl.
*G11B 5/596*    (2006.01)

(52) U.S. Cl.
CPC ............................... *G11B 5/59627* (2013.01)

(58) Field of Classification Search
None
See application file for complete search history.

(56) References Cited

U.S. PATENT DOCUMENTS

| 6,008,962 | A | * | 12/1999 | Le | G11B 5/59644 360/48 |
| 6,650,491 | B2 | * | 11/2003 | Suzuki | G11B 5/012 360/31 |
| 6,873,488 | B2 | * | 3/2005 | Teo | G11B 5/59683 360/31 |
| 7,088,535 | B2 | * | 8/2006 | Kim | G11B 19/04 360/31 |
| 7,948,708 | B2 | | 5/2011 | Messner et al. | |
| 8,699,172 | B1 | | 4/2014 | Gunderson et al. | |
| 8,988,814 | B1 | | 3/2015 | Harada et al. | |
| 9,214,186 | B1 | * | 12/2015 | Haralson | G11B 20/10305 |

FOREIGN PATENT DOCUMENTS

JP    08-031568 A    2/1996

* cited by examiner

*Primary Examiner* — K. Wong
(74) *Attorney, Agent, or Firm* — White & Case LLP

(57) ABSTRACT

According to one embodiment, there is provided a disk apparatus including a disk medium and a controller. The disk medium has a data area and a servo area. The controller obtains offset amount of a head from a target position along an cross-track direction based on a signal read from the data area by the head and performs first control to cause the head to approach the target position based on the offset amount.

18 Claims, 6 Drawing Sheets

--- CONTROL SIGNAL
— DATA

FIG.3
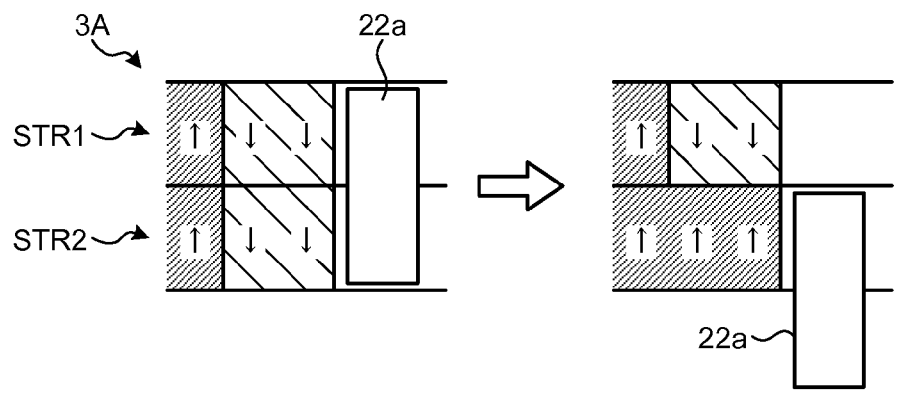
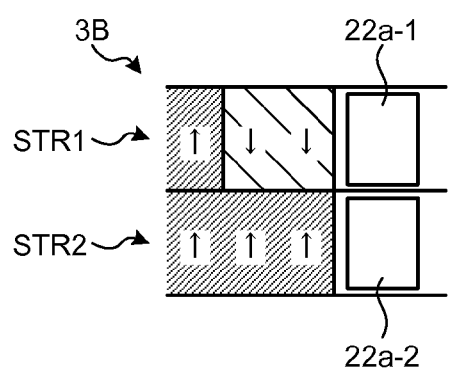
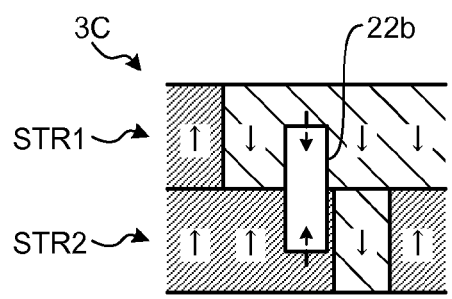
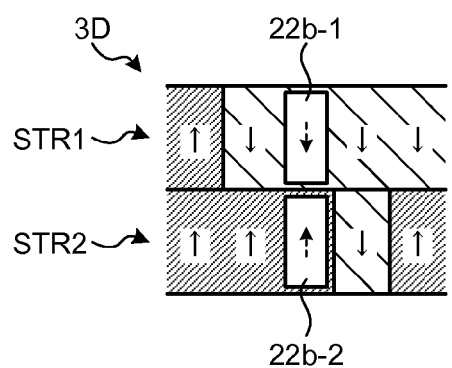

US 9,626,995 B2

DISK APPARATUS, CONTROLLER, AND CONTROL METHOD

CROSS-REFERENCE TO RELATED APPLICATIONS

This application is based upon and claims the benefit of priority from Japanese Patent Application No. 2015-139131, filed on Jul. 10, 2015; the entire contents of which are incorporated herein by reference.

FIELD

Embodiments described herein relate generally to a disk apparatus, controller, and control method.

BACKGROUND

In these years, in disk apparatuses such as magnetic disk apparatuses, the density of data stored on a disk medium tends toward being made higher. Accordingly the track pitch of the disk medium tends toward becoming narrower. It is desired to more accurately control the position along an cross-track direction of the head when reading out data from a disk medium of a narrower track pitch by a head. The head positioning control is performed based on servo information items dotted along a circumferential direction.

BRIEF DESCRIPTION OF THE DRAWINGS

FIG. 3 is a diagram showing the controlled positions of a write head and a read head in the embodiment;

DETAILED DESCRIPTION

In general, according to one embodiment, there is provided a disk apparatus including a disk medium and a controller. The disk medium has a data area and a servo area. The controller obtains offset amount of a head from a target position along an cross-track direction based on a signal read from the data area by the head and performs first control to cause the head to approach the target position based on the offset amount.

Exemplary embodiments of a disk apparatus will be explained below in detail with reference to the accompanying drawings. The present invention is not limited to the following embodiments.

Embodiment

Figure 1:
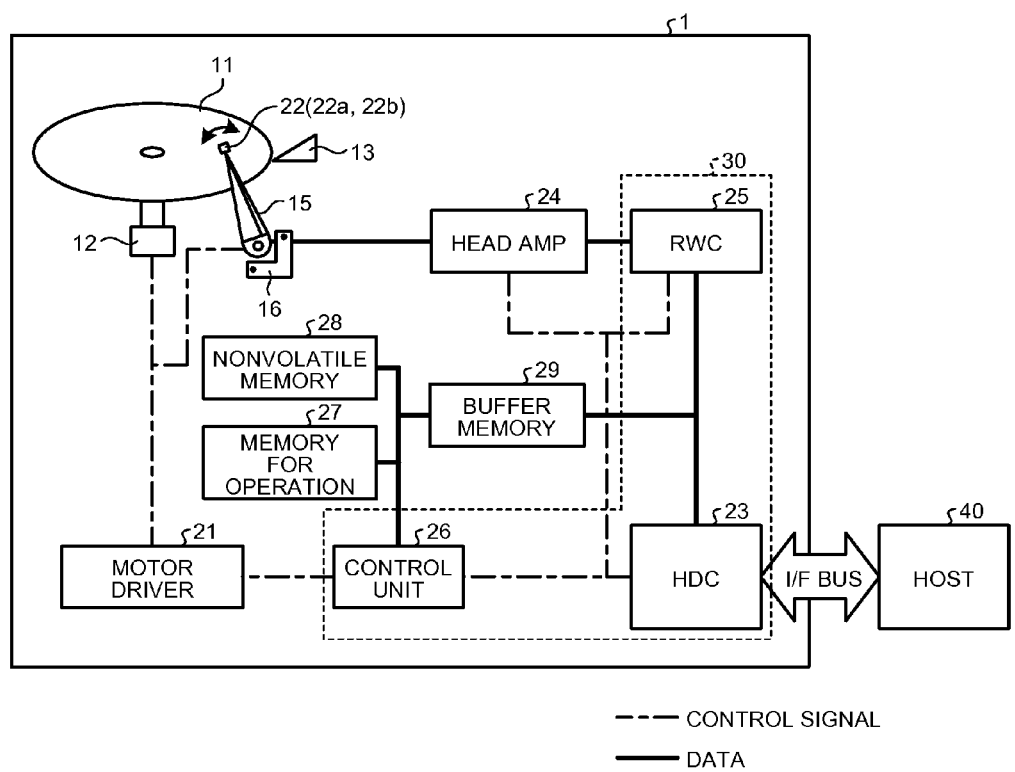
FIG. 1 is a diagram showing the configuration of a disk apparatus according to an embodiment.

A disk apparatus 1 according to the embodiment will be described using FIG. 1. FIG. 1 is a diagram showing the configuration of the disk apparatus 1.

The disk apparatus 1 has a disk medium 11 and records information onto the disk medium 11 according to a request from a host 40. The disk apparatus 1 is, for example, a magnetic disk apparatus, a magneto-optical disk apparatus, or the like. Hereinafter, the case where the disk apparatus 1 is a magnetic disk apparatus will be illustrated, but the present embodiment can be applied to other apparatuses as well.

The disk apparatus 1 records information onto a disk medium 11 via, e.g., a head 22 and reads a signal from the disk medium 11 via the head 22. Specifically, the disk apparatus 1 comprises the disk medium 11, a spindle motor 12, a motor driver 21, the head 22, an actuator arm 15, a voice coil motor (VCM) 16, a ramp 13, a head amplifier 24, a read write channel (RWC) 25, a hard disk controller (HDC) 23, a buffer memory 29, and a control unit 26.

The disk medium 11 is rotated by the spindle motor 12 with the rotation axis as the center at predetermined rotation speed. The rotation of the spindle motor 12 is driven by the motor driver 21. The disk medium 11 may be, for example, a magnetic disk, a magneto-optical disk, or the like. The disk medium 11 is, for example, a recording medium having a vertical magnetic recording layer. For example, a plurality of servo areas extending in radial directions from the vicinity of the center of the disk medium 11 are defined on the front and back sides of the disk medium 11. The servo areas may be arranged at equal intervals along a circumferential direction. For example, servo information including servo patterns is recorded on the servo areas. Further, a plurality of concentric circle-shaped tracks are defined outward from the vicinity of the center of the disk medium 11 on the front and back sides of the disk medium 11 by the servo patterns. On each track, data areas onto which user data is to be recorded are provided between the plurality of servo areas. That is, on each track, servo areas and data areas are alternately arranged repeatedly over one circle.

The head 22 writes and reads data onto and from the disk medium 11 by a write head 22a and a read head 22b provided therein. The head 22 is located at the tip of the actuator arm 15 and moved by the VCM 16 driven by the motor driver 21 along a radial direction (track-width direction) of the disk medium 11. While the rotation of the disk medium 11 is stopped, and so on, the head 22 is evacuated onto the ramp 13.

The head amplifier 24 amplifies the signal read by the head 22 from the disk medium 11 to output and supply to the RWC 25. Further, the head amplifier 24 amplifies a signal supplied from the RWC 25 to write data onto the disk medium 11 and supplies to the head 22.

The HDC 23 performs control of transmission/reception of data to/from the host 40 via an I/F bus, control of the buffer memory 29, data error correction on recorded data, and the like. The buffer memory 29 is used as a cache for data which is to be transmitted to or has been received from the host 40. The buffer memory 29 is used to temporarily store data read from the disk medium 11, data to be written onto the disk medium 11, or control firmware read from the disk medium 11, and so on.

The RWC 25 code-modulates data to be written onto the disk medium 11 supplied from the HDC 23 to supply to the head amplifier 24. Further, the RWC 25 code-demodulates a signal read from the disk medium 11 and supplied from the head amplifier 24 into digital data to output to the HDC 23.

A memory 27 for operation (e.g., an SRAM: Static Random Access Memory), a nonvolatile memory 28 (e.g., a Flash ROM: Flash Read Only Memory), and a buffer memory 29 for temporary storage (e.g., an SDRAM: Synchronous Dynamic Random Access Memory) are connected to the control unit 26. The control unit 26 controls the disk apparatus 1 overall according to firmware (program data) stored beforehand in the nonvolatile memory 28 and the disk medium 11. The control unit 26 is, for example, a CPU. The firmware includes initial firmware and control firmware used for usual operation. The initial firmware executed first at startup is stored in, e.g., the nonvolatile memory 28. The control firmware may include part of the function of a controller 30 (see FIG. 5) as described later. The control firmware used for usual operation is recorded on the disk medium 11 and, by control according to the initial firmware, read from the disk medium 11 into the buffer memory 29 for temporary storage and then stored into the memory 27 for operation.

Note that the configuration including the RWC 25, control unit 26, and HDC 23 may be regarded as the controller 30.

In the disk apparatus 1 such as a magnetic disk apparatus, the value of an information bit is represented by a magnetization direction on the disk medium 11, and hence an increase in the record density on the disk medium 11 may cause inter-symbol interference, so that the quality of the reproduced signal degrades. For example, there is an information recording method in which binary values of "D1" and "D2" depending on the magnetization direction are recorded as magnetization information onto the disk medium 11, where D1 is the state of being magnetized in a first direction and D2 is the state of being magnetized in a second direction opposite to the first direction. With this information recording method, it is difficult to achieve both suppression of degradation in the quality of the reproduced signal and improvement of information record density.

In the present embodiment, the disk apparatus 1 is configured such that three signal levels of +1, 0, −1 can be recorded onto the disk medium 11. By recording three-valued record symbols onto the disk medium 11, the amount of information per symbol is increased. Thus, the amount of information that can be recorded onto the disk medium 11 can be increased while increasing record pitches between symbols, so that the record density can be improved while suppressing inter-symbol interference.

Figure 2:
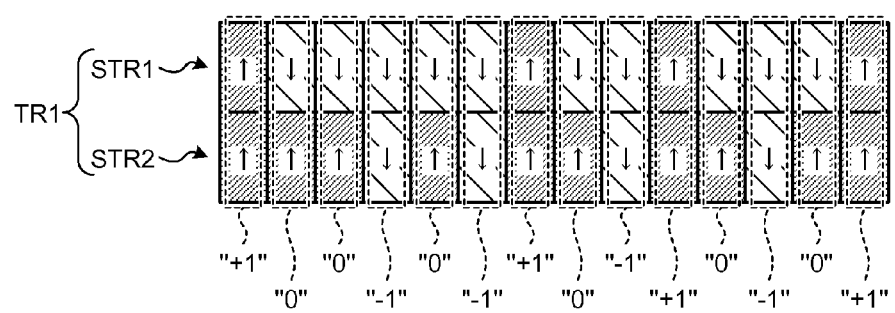
FIG. 2 is a diagram showing the record states of being magnetized of a track in the embodiment.

That is, by defining three levels (+1, 0, −1) for the record states of one record symbol, the real number of information bits that can be recorded in one record symbol can be increased. For example, one method which realizes three levels of magnetized states is to provide two sub-tracks STR1, STR2 in one reproduction track TR1 as shown in FIG. 2. FIG. 2 is a diagram showing the record states of being magnetized of the track TR1. For example, for the sub-tracks STR1, STR2, the state of being magnetized in the first direction is denoted by "D1" (indicated by dense hatching in FIG. 2), and the state of being magnetized in the second direction opposite to the first direction is denoted by "D2" (indicated by coarse hatching in FIG. 2). Here, a method can be thought of in which three levels are denoted by combinations of the binary record states of the two sub-tracks STR1, STR2 arranged along an cross-track direction: (D1, D1)=+1, (D2, D1)=0, and (D2, D2)=−1. That is, on the disk medium 11, a signal of three levels can be recorded onto data areas on the track TR1 in the form of combinations of magnetization information recorded on the sub-track STR1 and magnetization information recorded on the sub-track STR2. The track TR1 can be regarded as one track for record symbols. In addition, a method which performs three levels of unsaturated recording and the like can be thought of.

Writing magnetization information as shown in FIG. 2 onto a data area can be realized by a shingled recording scheme as shown in, e.g., 3A of FIG. 3. FIG. 3 is a diagram showing the controlled positions of the write head 22a and the read head 22b. That is, magnetization information is recorded in two recording steps onto the disk medium 11 using one write head 22a. In the example of 3A of FIG. 3, in the first-time recording, magnetization information of D1, D2, and D2 is written simultaneously onto the two sub-tracks STR1, STR2 by one write head 22a. In the second-time recording, the one write head 22a is shifted by one sub-track width toward the STR2, and magnetization information of D1, D1, and D1 is written onto the sub-track STR2 by the one write head 22a. Thus, symbols of (D1, D1)=+1, (D2, D1)=0, and (D2, D1)=0 as shown in FIG. 2 are sequentially recorded onto the disk medium 11.

Or writing magnetization information onto a data area can be realized by a recording method as shown in, e.g., 3B of FIG. 3. That is, magnetization information is recorded onto the disk medium 11 using two write heads 22a-1, 22a-2. That is, magnetization information of (D1, D1) is written simultaneously onto the two sub-tracks STR1, STR2 by the two write heads 22a-1, 22a-2. Then likewise, (D2, D1) and (D2, D1) are written simultaneously onto the two sub-tracks STR1, STR2. Thus, symbols of (D1, D1)=+1, (D2, D1)=0, and (D2, D1)=0 as shown in FIG. 2 are sequentially recorded onto the disk medium 11.

Reading magnetization information as shown in FIG. 2 from a data area can be realized by a reproducing method as shown in, e.g., 3C of FIG. 3. That is, magnetization information is read simultaneously from the two sub-tracks STR1, STR2 using one read head 22b. Thus, a signal corresponding to the values of the symbols can be sequentially reproduced from regions where symbols of (D1, D1)=+1, (D2, D1)=0, and (D2, D1)=0 are recorded as shown in FIG. 2.

Or reading magnetization information from a data area can be realized by a reproducing method as shown in, e.g., 3D of FIG. 3. That is, magnetization information is read simultaneously from the two sub-tracks STR1, STR2 using two read heads 22b-1, 22b-2. Then the controller 30 combines the signals read by the read heads 22b-1, 22b-2. Thus, a signal corresponding to the values of the symbols can be sequentially reproduced from regions where symbols of (D1, D1)=+1, (D2, D1)=0, and (D2, D1)=0 are recorded as shown in FIG. 2.

With the recording method shown in, e.g., 3A or 3B of FIG. 3, because the density of data stored on the disk medium 11 is made higher, the track pitch of the sub-tracks STR1, STR2 tends toward becoming narrower. It is desired to accurately control the position of the read head 22b along an cross-track direction when reading magnetization information from a data area on the sub-tracks STR1, STR2 of a narrower track pitch by the read head 22b. With the reproducing method shown in, e.g., 3C of FIG. 3, it is desired to accurately position the read head 22b at a position near the boundary between the sub-tracks STR1 and STR2. With the reproducing method shown in, e.g., 3D of FIG. 3, it is desired to accurately position the read heads 22b-1, 22b-2 respectively at the track center of the sub-track STR1 and the track center of the sub-track STR2.

The positioning control of the read head 22b can be performed using servo information read from servo areas, for example. That is, the controller 30 reads servo information from servo areas and obtains the offset amount of the read head 22b from the target position along an cross-track direction based on the read servo information. Then the controller 30 controls the read head 22b to approach the target position based on that offset amount. That is, the controller 30 applies a gain to the offset amount to obtain a drive amount of the read head 22b to cancel out the offset amount and performs control to correct the position along an cross-track direction of the read head 22b according to the drive amount (offset correcting control).

Figure 4:
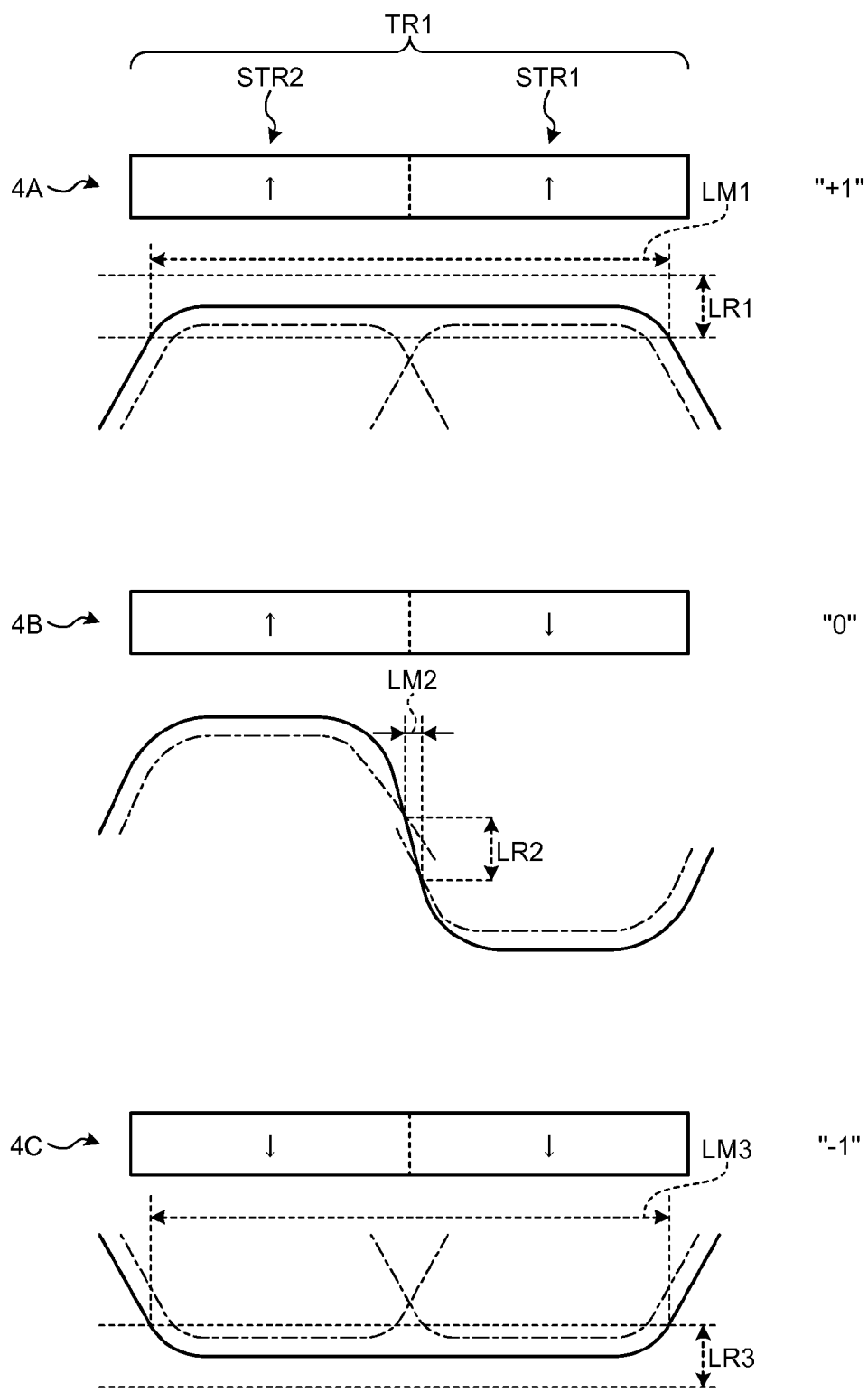
FIG. 4 is a diagram showing relations between the position of the read head and the read signal in the embodiment.

However, with the reproducing method shown in, e.g., 3C of FIG. 3, the offset margin relative to a target position may be very small compared with one track width of record symbols. Where a symbol having a value of +1 is reproduced as shown in 4A of FIG. 4, such a read position margin (read margin) that the reproduced signal falls within the level range LR1 corresponding to the value of +1, has a magnitude of LM1 corresponding to the width of the track TR1. FIG. 4 is a diagram showing relations between the position of the read head 22b and the read signal. Where a symbol having a value of −1 is reproduced as shown in 4C of FIG. 4, such a read position margin (read margin) that the reproduced signal falls within the level range LR3 corresponding to the value of −1, has a magnitude of LM3 corresponding to the width of the track TR1.

In contrast, where a symbol having a value of 0 is reproduced as shown in 4B of FIG. 4, such a read position margin (read margin) that the reproduced signal falls within the level range LR2 corresponding to the value of 0, has a magnitude of LM2 very much smaller than the width of the track TR1. Therefore, it is desired to control to accurately position the read head 22b at the target position along an cross-track direction even during the period when information is being read from the data area between servo areas.

Accordingly, in the present embodiment, the disk apparatus 1 obtains the offset amount of the read head 22b from the target position along an cross-track direction based on the signal read from data areas on the sub-tracks by the read head 22b. The disk apparatus 1 performs control to cause the read head 22b to approach the target position based on the offset amount, thereby improving accuracy in positioning the read head 22b during the period when information is being read from a data area. Although the case where the recording method of the disk apparatus 1 is the recording method (shingled recording scheme) shown in 3A of FIG. 3 and where the reproducing method of the disk apparatus 1 is the reproducing method shown in 3C of FIG. 3 will be illustrated below, the present embodiment can be applied to other recording and reproducing methods as well.

Specifically, if the position of the read head 22b deviates from the center of the track TR1 (a position near the boundary between the sub-tracks STR1 and STR2) on which record symbols exist, then the read margin for the "0" level of the three values is small, so that degradation in reproduction quality is likely to occur (see 4B of FIG. 4). In contrast, the "±1" level has a read margin large to a certain degree, so that even if the position of the read head 22b deviates from the center of the track TR1 of record symbols, those levels are not likely to degrade extremely as the "0" level does (see 4A, 4C of FIG. 4).

Thus, the ratio (likelihood ratio) of the likelihood of the probability of the "0" level to the likelihood of the probability of the "±1" level in convolutional decoding is expected to greatly degrade if the head position is offset from the center of the track TR1 of record symbols. That is, the controller 30 performs feedback control to reduce the degradation amount of the likelihood ratio, so that offset correcting control at the time of reading is possible.

For example, the controller 30 uses the likelihood of an error of the "0" level and the likelihood of an error of the "±1" level expressed by the following equations 1 to 4.

Likelihood of an error of the "0" level=1−(likelihood of the probability of the "0" level)    Eq. 1

Likelihood of an error of the "+1" level=1−(likelihood of the probability of the "+1" level)    Eq. 2

Likelihood of an error of the "−1" level=1−(likelihood of the probability of the "−1" level)    Eq. 3

Likelihood of an error of the "±1" level={(likelihood of an error of the "+1" level)+(likelihood of an error of the "−1" level)}/2    Eq. 4

Then the controller 30 obtains the likelihood ratio (error likelihood ratio) of the likelihood of an error of the "0" level to the likelihood of an error of the "±1" level expressed by the following equation 5.

Error likelihood ratio=(likelihood of an error of the "0" level)/(likelihood of an error of the "±1" level)    Eq. 5

The controller 30 performs feedback control to cause the error likelihood ratio to approach zero, thereby controlling the read head 22b to approach the target position.

Further, the controller 30 can infer the absolute value of the offset amount from the likelihood ratio (error likelihood ratio), but it is difficult to infer in which direction the head is offset. Accordingly, the controller 30 makes magnetization information to be written onto the two sub-tracks when recording three-valued symbols be biased. For example, as shown in FIG. 2, the controller 30 records a signal of the "0" level in the form of (the magnetized state of the sub-track STR1, the magnetized state of the sub-track STR2)=(D2, D1), not using the opposite combination, i.e., (the magnetized state of the sub-track STR1, the magnetized state of the sub-track STR2)=(D1, D2). Thus, the controller 30 monitors the direction (±) of the deviation of the signal of the "0" level from the target level, so that the direction of the offset can be inferred.

That is, the controller 30 can obtain the error likelihood ratio based on the signal read from data areas on the sub-tracks STR1, STR2. At the same time, the controller 30 can obtain the direction of the offset from the direction of the deviation of the signal of the "0" level from the target level. That is, the controller 30 can infer toward which sub-track the read head 22b is offset by what degree. The controller 30, applying an appropriate gain to the likelihood ratio (error likelihood ratio), feeds it back to a positioning signal and thereby can obtain the position correction amount of the read head 22b.

Figure 5:
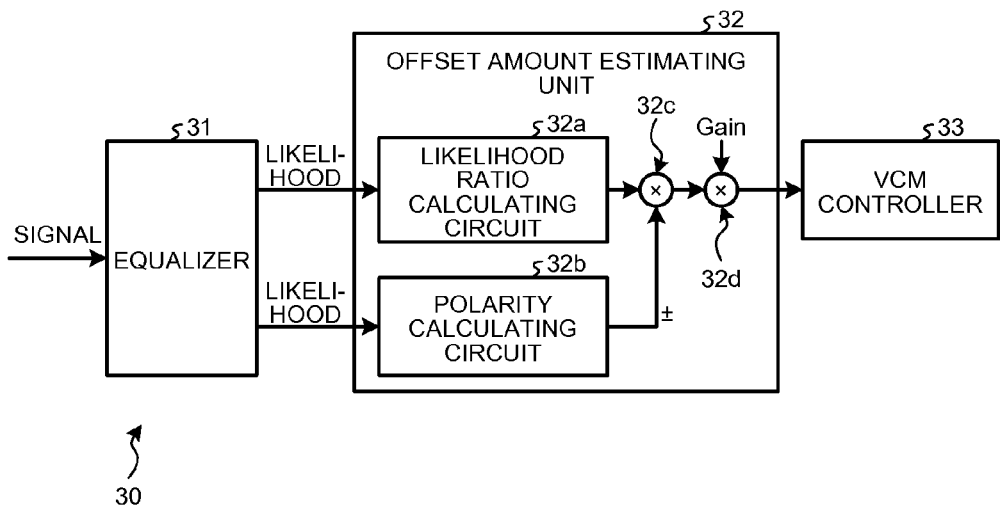
FIG. 5 is a diagram showing the configuration of a controller in the embodiment.

More specifically, the controller 30 has an equalizer 31, an offset amount estimating unit 32, and a VCM controller 33 as shown in FIG. 5. FIG. 5 is a diagram showing the configuration of the controller 30. The configuration of the controller 30 shown in FIG. 5 is a functional configuration and may be implemented by hardware (for example, as a System on Chip).

For example, the equalizer 31 and offset amount estimating unit 32 may be implemented by hardware in the RWC 25, and the VCM controller 33 may be implemented by hardware in the control unit 26. Or, for example, the equalizer 31 may be implemented by hardware in the RWC 25; the offset amount estimating unit 32 may be formed in a chip separate from the RWC 25 and the control unit 26; and the VCM controller 33 may be implemented by hardware in the control unit 26.

Or the controller 30 shown in FIG. 5 may be implemented by software in the control unit 26 or the like (e.g., as a function module that is developed by the control unit 26 or the like in the memory 27 for operation or the like at one time or sequentially as the process proceeds).

Or the controller 30 shown in FIG. 5 may have part of its function implemented by hardware in the hard disk controller 31 or the like and the rest implemented by software in the control unit 26 or the like.

The controller 30 infers the tracking deviation based on the probability (likelihood information) of information in data decoding and corrects this deviation.

For example, the equalizer 31 receives the signal read by the read head 22*b* from the disk medium 11 via the head amplifier 24. The equalizer 31 A/D converts the received signal (analog signal) and equalizes the A/D converted signal (digital signal) to a predetermined PR target (target level). The equalizer 31 performs sampling at predetermined time intervals on the digital signal to obtain, for each sample point, the likelihood of the probability of the signal being at the "0" level, the likelihood of the probability of being at the "+1" level, and the likelihood of the probability of being at the "−1" level.

The offset amount estimating unit 32 receives the likelihood of the probability of being at the "0" level, the likelihood of the probability of being at the "+1" level, and the likelihood of the probability of being at the "−1" level from the equalizer 31. The offset amount estimating unit 32 obtains the offset amount of the read head 22*b* from the target position and the direction of the offset based on these likelihoods.

Consider recording three-valued symbols (0, ±1) by the shingled recording scheme, for example. For the "±1" level, because the directions of recording magnetization of the two sub-tracks STR1, STR2 coincide (see FIG. 2), the position of the read head 22*b* has enough read margin along an cross-track direction (see 4A, 4C of FIG. 4). Thus, the reproduced output does not change much even if some read offset variation occurs. In contrast, for the "0" level, because the directions of recording magnetization of the two sub-tracks STR1, STR2 are different, if off-track variation occurs, so that the position of the read head 22*b* deviates from the target position (a position near the boundary between the sub-tracks STR1 and STR2), then the reproduced signal is biased toward the direction of recording magnetization of one of the tracks, so that the amplitude of the reproduced signal may greatly vary (see 4B of FIG. 4). In other words, this means that in recording three-valued symbols the reproduced signal of the "0" level is likely to be strongly affected by read offset variation as compared with the reproduced signal of the "±1" level (degradation in the quality of the reproduced signal per read offset is greater). Therefore, it means that conversely by monitoring the likelihood ratio (error likelihood ratio) corresponding to the difference in the quality of the reproduced signal between the "0" level and the "±1" level, to what degree the head is offset (the read offset amount) can be inferred.

As the method of estimating the read offset amount, for example, a method which uses the respective likelihood information of three value levels can be thought of. Replacing the quality of the reproduced signal mentioned above with the likelihood, the likelihood ratio of the "0" level to the "±1" level can be considered to correspond to the read offset amount. Because of the point that the likelihood information directly corresponds to the quality of the reproduced signal and from the viewpoint of suppressing latency for performing offset correction feedback, it is desirable to use likelihood information after convolutional (Viterbi) decoding. For example, as the likelihood ratio, the likelihood ratio of the likelihood of an error of "0" levels in some consecutive bit sequence to the likelihood of an error of the "±1" level in the same consecutive bit sequence can be used as it is (thinking that the offset amount does not change between consecutive bits, but is constant). Or, for the likelihood ratio, the likelihood ratio of the likelihood of an error of "0" levels in some consecutive bit sequence to the likelihood of an error of the "±1" level in the same consecutive bit sequence can be averaged over a window section (e.g., a section having a width of several tens to several hundred bits along an cross-track direction).

For example, the offset amount estimating unit 32 has a likelihood ratio calculating circuit 32*a*, a polarity calculating circuit 32*b*, a multiplier 32*c*, and a multiplier 32*d*. The likelihood ratio calculating circuit 32*a* receives the likelihood of the probability of being at the "0" level, the likelihood of the probability of being at the "+1" level, and the likelihood of the probability of being at the "−1" level from the equalizer 31. The likelihood ratio calculating circuit 32*a* obtains the likelihood ratio (error likelihood ratio) of the likelihood of an error of the "0" level to the likelihood of an error of the "±1" level according to the aforementioned equations 1 to 5. The likelihood ratio calculating circuit 32*a* outputs the obtained likelihood ratio to the multiplier 32*c*.

Figure 6:
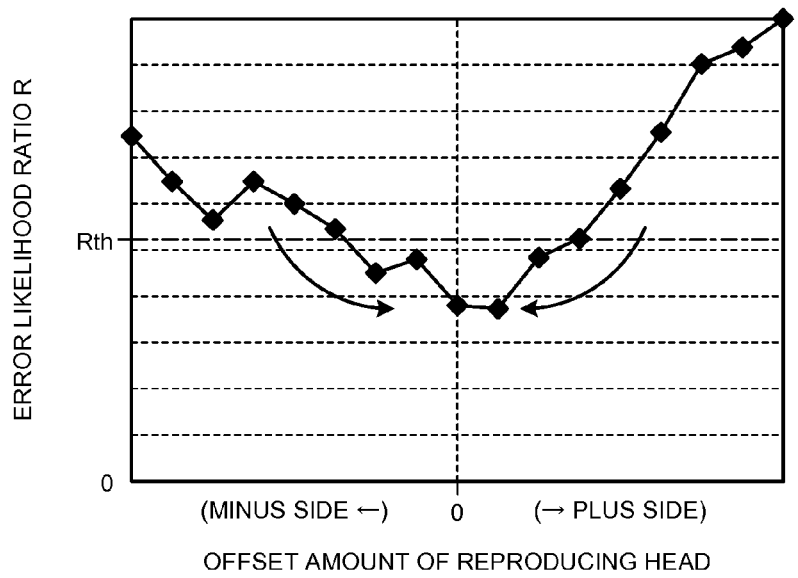
FIG. 6 is a graph showing a relation between the offset amount of the read head and the likelihood ratio in the embodiment.

FIG. 6 shows the likelihood ratio (error likelihood ratio) calculated by the likelihood ratio calculating circuit 32*a* when the read offset amount is made to change. FIG. 6 is a graph showing a relation between the offset amount of the read head 22*b* from the target position and the likelihood ratio. As expected, the way in which the error likelihood ratio increases (that is, the likelihood ratio of the probability degrades) as the read head 22*b* deviates farther from the center of the three-valued track (the boundary between the sub-tracks) can be seen.

It is possible to infer the absolute value of the read offset amount from the likelihood ratio, but it is difficult to determine the direction of the offset (toward which sub-track the head is offset). Accordingly, the controller 30 makes a rule in recording a symbol of the "0" level onto the two sub-tracks be biased. Specifically, it is determined that when recording a symbol of the "0" level as shown in FIG. 2, the combination of "D2" on the sub-track STR1 side and "D1" on the sub-track STR2 side should always be used. Thus, the direction of the offset of the read head 22*b* can be made to correspond to the deviation of the "0" level from the target level of convolutional decoding at the time of read offset one-to-one.

The polarity calculating circuit 32*b* obtains the polarity of the deviation of the "0" level from the target level and obtains the direction of the offset of the read head 22*b* according to the polarity. The polarity calculating circuit 32*b* outputs a sign (+ or −) indicating the direction to the multiplier 32*c*.

The multiplier 32*c* receives the error likelihood ratio from the likelihood ratio calculating circuit 32*a* and the sign (+ or −) indicating the direction from the polarity calculating circuit 32*b*. The multiplier 32*c* multiplies the error likelihood ratio by the sign (+ or −) indicating the direction to add information about the direction to the error likelihood ratio. The multiplier 32*c* outputs the multiplying result to the multiplier 32*d*.

The multiplier 32*d* multiplies the multiplying result (the error likelihood ratio to which information about the direction is added) received from the multiplier 32*c* by a gain to obtain the position correction amount for the read head 22b. The gain has a magnitude for converting the error likelihood ratio into the offset amount and a polarity for changing from the direction of the offset to such a direction as to cancel out the offset. The multiplier 32d supplies the position correction amount for the read head 22b to the VCM controller 33. The VCM controller 33 controls the VCM 16 to move the head 22 in a radial direction via the motor driver 21 according to the position correction amount for the read head 22b.

That is, the controller 30 estimates both the polarity and absolute value of the read offset by using two information items, the likelihood ratio and the direction of the deviation from the target level, and thus can perform read offset correction.

Figure 7:
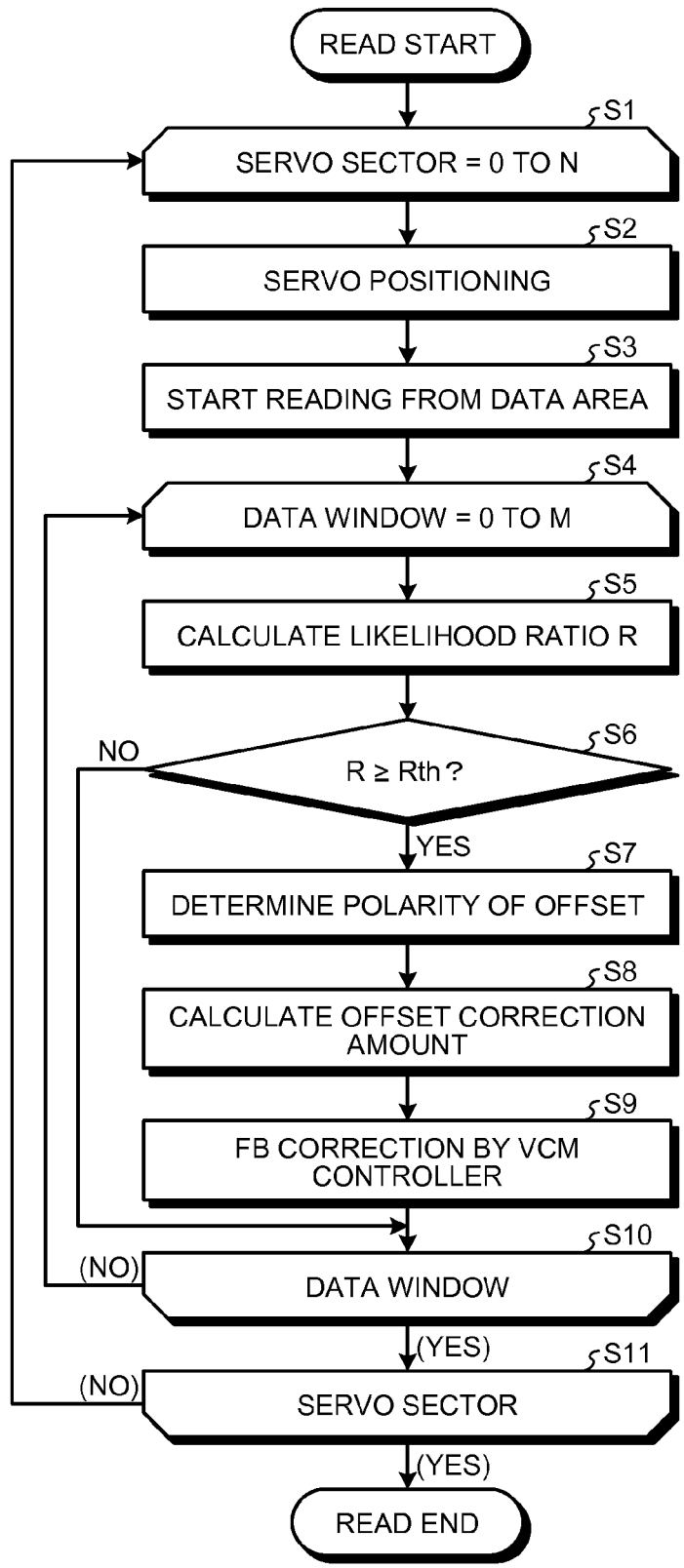
FIG. 7 is a flow chart showing the operation of the controller in the embodiment.

For example, the controller 30 can perform offset correcting control when reading as shown in FIG. 7. FIG. 7 is a flow chart showing the operation of the controller 30.

On the circle of each track of the disk medium 11, servo areas and data areas are alternately arranged repeatedly. For example, on each track, N number of servo sector areas each including a servo area and a data area adjacent to each other, where N is an integer of two or greater, are arranged. Servo information recorded in the servo area of each servo sector area includes identification information (the servo sector number) of the servo sector area.

When reading servo information from a servo area by the read head 22b, the controller 30 identifies the current servo sector number based on the servo information (S1). The current servo sector number is, for example, a number of from 0 to N.

Further, the controller 30 performs positioning control of the read head 22b using the servo information read from the servo area (S2). That is, the controller 30 obtains the offset amount of the read head 22b from the target position (a boundary position between the sub-tracks STR1 and STR2) along an cross-track direction based on the servo information read from the servo area. Then the controller 30 performs control to cause the read head 22b to approach the target position based on the offset amount. That is, the controller 30 applies a gain to the offset amount, obtains the drive amount of the read head 22b to cancel out the offset amount, and performs control (offset correcting control) to correct the position along an cross-track direction of the read head 22b according to the drive amount.

Then the controller 30 starts reading operation for the data area (S3). That is, the controller 30 sets M number of window sections, where M is an integer of two or greater, in the data area of the current servo sector area and holds setting information in which window sections and their respective identification information (window numbers) are associated with each other. The window sections can be set arbitrarily, and can be set to be, for example, sections having a width of several tens to several hundred bits along a down-track direction (sections where several tens to several hundred symbols are recorded) (see FIG. 2). The controller 30 identifies the current window number based on the setting information (S4). The current window number is, for example, a number of from 0 to M.

The controller 30 calculates the error likelihood ratio R expressed by the aforementioned equation 5 for the current window section (S5). That is, the controller 30 obtains the likelihood of the probability of the "0" level, the likelihood of the probability of the "+1" level, and the likelihood of the probability of the "−1" level based on the signal read from the current window section by the read head 22b. The controller 30 obtains the likelihood of an error of the "0" level and the likelihood of an error of the "±1" level according to the aforementioned equations 1 to 4. The controller 30 obtains the likelihood ratio (error likelihood ratio R) of the likelihood of an error of the "0" level to the likelihood of an error of the "±1" level according to the aforementioned equation 5. For example, the controller 30 averages the respective results of calculating the error likelihood ratio R at multiple times in the window section.

The controller 30 determines whether or not the error likelihood ratio R is at or above a threshold Rth (S6). The threshold Rth can be determined using, as a reference, a position at which the offset amount of the read head 22b from the target position goes outside a permissible range (see FIG. 6).

For example, immediately after servo, in the window section at the start of a data sector (window number=0), the head is thought to be positioned substantially at the center of the track of three-valued symbols, and hence the likelihood ratio (error likelihood ratio R) calculated during this window section or a value obtained by adding a margin to the likelihood ratio can be used as the threshold Rth. Or the threshold Rth may be determined experimentally beforehand as being the value of the error likelihood ratio R corresponding to a position at which the offset amount of the read head 22b from the target position goes outside the permissible range. The threshold Rth can be calibrated beforehand.

If the error likelihood ratio R is at or above the threshold Rth (Yes at S6), the controller 30 performs offset correcting control (S7 to S9) and, if the error likelihood ratio R is below the threshold Rth (No at S6), does not perform offset correcting control (the process proceeds to S10).

For example, if the error likelihood ratio R is at or above the threshold Rth (Yes at S6), the controller 30 obtains the polarity of deviation of the signal of the "0" level from the target level and obtains the direction of the offset according to the polarity (S7). Further, the controller 30 applies a gain to the error likelihood ratio R to obtain the offset amount of the read head 22b from the target position along an cross-track direction. The gain has a magnitude for converting the error likelihood ratio into the offset amount and a polarity for changing from the direction of the offset to such a direction as to cancel out the offset. The magnitude for converting the error likelihood ratio into the offset amount can be determined experimentally beforehand. The gain can be calibrated beforehand.

Then the controller 30 calculates the drive amount (offset correction amount) of the read head 22b to cancel out the offset amount (S8). The controller 30 makes the VCM controller 33 (see FIG. 5) operate according to the offset correction amount and performs feedback control (FB correction) to cause the read head 22b to approach the target position via the motor driver 21 and the VCM 16 (S9).

When S9 finishes, or if the error likelihood ratio R is below the threshold Rth (No at S6), the controller 30 determines whether the current window section is the last window section (window number=M) in the data area (S10). If the current window section is not the last window section (No at S10), the controller 30 increments the window number and has the process return to S4.

If the current window section is the last window section (Yes at S10), then the controller 30 determines whether the current servo sector area is the last servo sector area (servo sector number=N) in the track (S11). If the current servo sector area is not the last servo sector area (No at S11), the controller 30 increments the servo sector number and has the process return to S1.

If the current servo sector area is the last servo sector area (Yes at S11), the controller 30 finishes read processing for the current track. The controller 30 can perform the same processing as in S1 to S11 when reading other tracks.

In this way, the controller 30 enables decoding at an appropriate read position by correcting the read center position based on the difference in likelihood information between the "0" level and the "±1" level when reproducing three-valued symbols by the shingled recording scheme.

As described above, in the embodiment, in the disk apparatus 1, the controller 30 obtains the offset amount of the read head 22b from the target position along an cross-track direction and the direction of the offset based on the signal read from a data area by the read head 22b and, based on these, performs offset correcting control to cause the read head 22b to approach the target position. Thus, accuracy in positioning the read head 22b while reading information from the data area (e.g., in real time) can be improved.

Further, in the embodiment, on the disk apparatus 11, three levels, e.g., the "+1" level, the "−1" level, and the "0" level are recorded onto data areas of a track TR1 including the sub-tracks STR1, STR2 in the form of the magnetization information (D1 or D2) recorded on the adjacent sub-tracks STR1, STR2. The controller 30 obtains the likelihood ratio of the likelihood of an error of the "0" level to the likelihood of an error of the "±1" level based on the signal read from a data area by the read head 22b. If the likelihood ratio is at or above the threshold, the controller 30 performs offset correcting control and, if the likelihood ratio is below the threshold, does not perform offset correcting control. Thus, the controller 30 can perform offset correcting control, in response to the offset amount of the read head from the target position going outside the permissible range.

Further, in the embodiment, when recording symbols of the "0" level from among three levels, e.g., the "+1" level, the "−1" level, and the "0" level recorded on the disk apparatus 11, magnetization information to be written onto the two sub-tracks is made to be biased. It records a signal of the "0" level in the form of (the magnetized state of the sub-track STR1, the magnetized state of the sub-track STR2)=(D2, D1), not using the opposite combination, (the magnetized state of the sub-track STR1, the magnetized state of the sub-track STR2)=(D1, D2). Thus, the controller 30 can obtain the polarity of deviation of the signal of the "0" level from the target level and obtain the direction of the offset of the read head 22b according to the polarity, so that it can accurately obtain the direction in which to correct the offset of the read head 22b. Note that, as long as magnetization information can be made to be biased, the magnetized states may be the opposite. That is, it may record a signal of the "0" level in the form of (the magnetized state of the sub-track STR1, the magnetized state of the sub-track STR2)=(D1, D2), not using the opposite combination, (the magnetized state of the sub-track STR1, the magnetized state of the sub-track STR2)=(D2, D1).

Yet further, in the embodiment, the controller 30 performs control to correct the offset of the read head 22b from the target position based on the servo information read from a servo area and then performs control to correct the offset of the read head 22b from the target position based on the signal read from a data area. Thus, the controller 30 can perform correction of the offset of the read head 22b in two stages, so that accuracy in positioning the read head 22b while reading information from a data area can be easily improved.

Note that, where the reproducing method of the disk apparatus 1 is the reproducing method shown in 3D of FIG. 3, a boundary position between the sub-tracks STR1 and STR2 can be obtained, and the read heads can be positioned at the centers of the sub-tracks STR1 and STR2 referring to the boundary position. Therefore, also where the reproducing method of the disk apparatus 1 is the reproducing method shown in 3D of FIG. 3, offset correcting control to cause the read heads 22b to approach the target positions (the centers of the sub-tracks) can be performed highly accurately, so that accuracy in positioning the read heads 22b can be improved.

Figure 8:
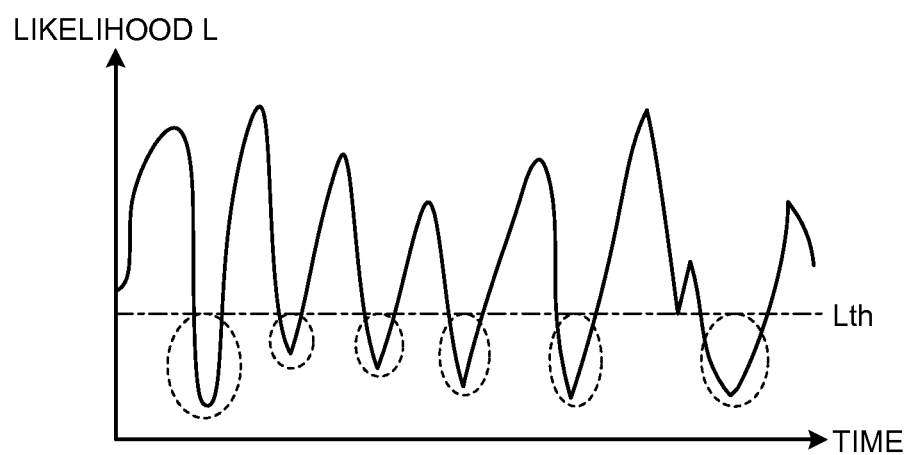
FIG. 8 is a graph showing the operation of the controller in a modified example of the embodiment.

The controller 30 may use the ratio between the respective numbers of times when the likelihood of the probability of the "0" level and the likelihood of the probability of the "±1" level are below a threshold level Lth as an index to determine whether to perform offset correcting control, instead of the error likelihood ratio. That is, the controller 30 has first, second, and third counters (not shown). The first counter counts up the number of times when the likelihood of the probability of the "0" level is below the threshold level Lth during the window section. The second counter counts up the number of times when the likelihood of the probability of the "+1" level is below the threshold level Lth during the window section. The third counter counts up the number of times when the likelihood of the probability of the "−1" level is below the threshold level Lth during the window section. Each of the first, second, and third counters counts up the count at timings enclosed by broken lines in FIG. 8. FIG. 8 is a graph showing the operation (count operation) of the controller 30.

For example, the controller 30 uses the number of error times of the "0" level and the number of error times of the "±1" level expressed by the following equations 6 to 9.

$$\text{Number of error times of the ``0'' level} = \text{the count of the first counter} \quad \text{Eq. 6}$$

$$\text{Number of error times of the ``+1'' level} = \text{the count of the second counter} \quad \text{Eq. 7}$$

$$\text{Number of error times of the ``−1'' level} = \text{the count of the third counter} \quad \text{Eq. 8}$$

$$\text{Number of error times of the ``±1'' level} = \{(\text{number of error times of the ``+1'' level}) + (\text{number of error times of the ``−1'' level})\}/2 \quad \text{Eq. 9}$$

Then the controller 30 obtains the number-of-times ratio (number-of-error-times ratio) of the number of error times of the "0" level to the number of error times of the "±1" level expressed by the following equation 10.

$$\text{Number-of-error-times ratio} = (\text{number of error times of the ``0'' level})/(\text{number of error times of the ``±1'' level}) \quad \text{Eq. 10}$$

For example, the controller 30 performs such operation that "likelihood" and "likelihood ratio" are respectively replaced with "number of times" and "number-of-times ratio" in the description of the operation shown in FIG. 7.

In this way, by determining whether to perform offset correcting control using the number-of-times ratio of the number of error times of the "0" level to the number of error times of the "±1" level, offset correcting control less likely to be affected by the influence of the response speed of positioning control and of local record quality can be realized.

Although in the embodiment the case where offset correcting control is performed in response to the likelihood ratio being at or above the threshold is illustrated, a method which does not set the reference (threshold Rth) for the likelihood ratio is also possible. That is, the controller 30 obtains the likelihood ratio of the likelihood of an error of the "0" level to the likelihood of an error of the "±1" level at a first time. The controller 30 obtains the likelihood ratio of the likelihood of an error of the "0" level to the likelihood of an error of the "±1" level at a second time after the first time. The controller 30 performs offset correcting control based on the magnitude relation between the likelihood ratio at the first time and the likelihood ratio at the second time. If the likelihood ratio at the second time is greater than the likelihood ratio at the first time, the controller 30 performs offset correcting control and, if the likelihood ratio at the second time is less than or equal to that at the first time, does not perform offset correcting control.

For example, in the operation shown in FIG. 7, the controller 30 calculates the error likelihood ratio R expressed by the aforementioned equation 5 for the current window section (S5) and holds the error likelihood ratio R in association with identification information of the current window section. Then the controller 30, instead of determining whether or not the error likelihood ratio R is at or above the threshold Rth, determines whether or not the error likelihood ratio R for the current window section is greater than or equal to the error likelihood ratio R' for the preceding window section (S6).

If the error likelihood ratio R is greater than or equal to the error likelihood ratio R' (Yes at S6), the controller 30 performs offset correcting control (S7 to S9), and, if the error likelihood ratio R is less than the error likelihood ratio R' (No at S6), does not perform offset correcting control (the process proceeds to S10).

In this way, the disk apparatus may monitor time series variation in the likelihood ratio on a per window section basis and, when the likelihood ratio for the current window section becomes worse than the likelihood ratio for the preceding window section, determine that the read offset amount probably has gone outside a permissible range and may perform offset position correction.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk apparatus comprising:
a disk medium having a data area and a servo area, on the disk medium, a signal of three levels can be recorded onto the data area on a track including first and second sub-tracks in a form of combinations of information recorded on the first sub-track and information recorded on the second sub-track adjacent to the first sub-track, the three levels including a first level, a second level, and a third level between the first level and the second level; and
a controller that obtains a likelihood ratio of likelihood of the third level to likelihood of the first level and of the second level based on a signal read from the data area by a head, obtains offset amount of the head from a target position along an cross-track direction and a direction of the offset according to the obtained likelihood ratio, and performs first control to cause the head to approach the target position based on the offset amount and the direction.

2. The disk apparatus according to claim 1, wherein the controller performs, in parallel, the first control and an operation to read the signal from the data area by the head.

3. The disk apparatus according to claim 1, wherein the target position is a position near a boundary between the first sub-track and the second sub-track.

4. The disk apparatus according to claim 1, wherein if the likelihood ratio is at or above a threshold, the controller performs the first control and, if the likelihood ratio is below the threshold, does not perform the first control.

5. The disk apparatus according to claim 1, wherein the controller obtains polarity of deviation of the third level from a target level to obtain the direction according to the polarity.

6. The disk apparatus according to claim 1, wherein the first level is recorded in the form of a combination of a first magnetized state recorded on the first sub-track and the first magnetized state recorded on the second sub-track,
wherein the second level is recorded in the form of a combination of a second magnetized state recorded on the first sub-track and the second magnetized state recorded on the second sub-track, and
wherein the third level is recorded in the form of a combination of the first magnetized state recorded on the first sub-track and the second magnetized state recorded on the second sub-track, not using a combination of the second magnetized state recorded on the first sub-track and the first magnetized state recorded on the second sub-track.

7. The disk apparatus according to claim 1, wherein the controller obtains a first likelihood ratio of likelihood of the third level to likelihood of the first level and of the second level at a first time and a second likelihood ratio of likelihood of the third level to likelihood of the first level and of the second level at a second time after the first time and performs the first control based on a magnitude relation between the first likelihood ratio and the second likelihood ratio.

8. The disk apparatus according to claim 7, wherein if the second likelihood ratio is greater than the first likelihood ratio, the controller performs the first control and, if the second likelihood ratio is less than or equal to the first likelihood ratio, does not perform the first control.

9. The disk apparatus according to claim 1, wherein the controller counts the first and second numbers of times when the likelihood of the probability of the third level and the likelihood of the probability of the first level and of the second level, respectively, are below a threshold level and performs the first control according to the ratio of the first number of times to the second number of times.

10. The disk apparatus according to claim 1, wherein the controller obtains a second offset amount of the head from the target position along an cross-track direction based on servo information read from the servo area, performs second control to cause the head to approach the target position based on the second offset amount, and, after performing the second control, performs the first control.

11. A controller comprising:
an input circuit to which a signal read by a head from the data area of a disk medium having a data area and a servo area is input, on the disk medium, a signal of three levels can be recorded onto the data area on a track including first and second sub-tracks in a form of combinations of information recorded on the first sub-track and information recorded on the second sub-track adjacent to the first sub-track, the three levels include a first level, a second level, and a third level between the first level and the second level; and
a computing unit that obtains a likelihood ratio of likelihood of the third level to likelihood of the first level and of the second level based on the input signal, and that obtains offset amount of a head from a target position along an cross-track direction and a direction of the offset according to the obtained likelihood ratio.

12. The controller according to claim 11, wherein
the computing unit obtains polarity of deviation of the third level from a target level to obtain the direction according to the polarity.

13. The controller according to claim 11, wherein
the computing unit obtains a first likelihood ratio of likelihood of the third level to likelihood of the first level and of the second level at a first time and a second likelihood ratio of likelihood of the third level to likelihood of the first level and of the second level at a second time after the first time.

14. The controller according to claim 11, wherein
the computing unit counts the first and second numbers of times when the likelihood of the probability of the third level and the likelihood of the probability of the first level and of the second level, respectively, are below a threshold level and obtains the ratio of the first number of times to the second number of times.

15. A control method of a disk apparatus comprising:
recording a signal of three levels onto a data area of a disk medium on a track including first and second sub-tracks in a form of combinations of information recorded on the first sub-track and information recorded on the second sub-track adjacent to the first sub-track, the disk medium having the data area and a servo area, the three levels including a first level, a second level, and a third level between the first level and the second level;
obtaining a likelihood ratio of likelihood of the third level to likelihood of the first level and of the second level based on the read signal;
obtaining offset amount of the head from a target position along an cross-track direction and a direction of the offset according to the obtained likelihood ratio; and
performing control to cause the head to approach the target position based on the offset amount.

16. The control method according to claim 15,
wherein the obtaining the direction of the offset includes obtaining polarity of deviation of the third level from a target level and obtaining the direction according to the polarity.

17. The control method according to claim 15,
wherein the obtaining the likelihood ratio includes obtaining a first likelihood ratio of likelihood of the third level to likelihood of the first level and of the second level at a first time and a second likelihood ratio of likelihood of the third level to likelihood of the first level and of the second level at a second time after the first time, and
the performing the control includes performing the control based on a magnitude relation between the first likelihood ratio and the second likelihood ratio.

18. The control method according to claim 15,
wherein the obtaining the likelihood ratio includes counting the first and second numbers of times when the likelihood of probability of the third level and the likelihood of probability of the first level and of the second level, respectively, are below a threshold level, and
the performing the control includes performing the control according to the ratio of the first number of times to the second number of times.

* * * * *